US005856380A

United States Patent [19]

Bauer et al.

[11] Patent Number: 5,856,380

[45] Date of Patent: Jan. 5, 1999

[54] PROCESS FOR FLAME-PROOFING ORGANIC POLYMERIC MATERIALS

[75] Inventors: Michael Bauer, Freiburg, Germany; Manfred Rembold, Pfeffingen, Switzerland

[73] Assignee: Ciba Specialty Chemical Corporation, Tarrytown, N.Y.

[21] Appl. No.: 656,268

[22] PCT Filed: Dec. 3, 1994

[86] PCT No.: PCT/EP94/04029

§ 371 Date: Jun. 14, 1996

§ 102(e) Date: Jun. 14, 1996

[87] PCT Pub. No.: WO95/16715

PCT Pub. Date: Jun. 22, 1995

[30] Foreign Application Priority Data

Dec. 16, 1993 [CH] Switzerland ............................ 9767/93

[51] Int. Cl.[6] .................................. C08J 3/28; B32B 9/04

[52] U.S. Cl. .......................... 523/300; 428/704; 427/447; 427/393.5; 427/255.6

[58] Field of Search ................................ 427/447, 393.5, 427/255.6; 428/704; 523/300

[56] References Cited

FOREIGN PATENT DOCUMENTS 1266591 3/1990 Canada .

OTHER PUBLICATIONS

Akovali et al., "Studies on Flame Retardancy of Polyacrylonitrile Fiber Treated by Flame Retardant Monomers in Cold Plasma", J. App. Polym. Sci., vol. 41, 2011–2019 (1990).

Simionescu et al., ACS Symp. Ser 187, 57 (1982).

*Primary Examiner*—Kriellion A Sanders

*Attorney, Agent, or Firm*—Kevin T. Mansfield

[57] ABSTRACT

A process is described for flame-proofing organic polymeric materials by means of a low temperature plasma treatment in the presence of at least one volatile, low-molecular compound. The process comprises subjecting a volatile compound, selected from a halogen-free phosphorus compound, to the low temperature plasma, such that a homogeneous polymeric structure forms on the organic material. A very wide range of organic materials can be effectively flame-proofed with the process of this invention without adversely affecting their other properties such as mechanical properties or photochemical stability.

16 Claims, No Drawings

PROCESS FOR FLAME-PROOFING ORGANIC POLYMERIC MATERIALS

The present invention relates to a process for flame-proofing organic polymeric materials by means of a plasma treatment in the presence of at least one phosphorus-containing, low-molecular compound, to the organic material treated with said novel process as well as to a process for the preparation of phosphorus-containing, halogen-free films of polymeric structure.

Polymeric material can usually be flame-proofed by impregnating a copolymer of phosphorus-containing monomers. Such treatment of fibre materials with compositions containing phosphorus compounds is disclosed, inter alia, in U.S. Pat. Nos. 2,926,145 and 2,733,229. To achieve effective flame-proofing in these processes, it is necessary to use a large amount of active substance which, however, may adversely affect the properties of the organic substrate, for example the photochemical stability or the mechanical properties.

In the known plasmachemical flame-proofing methods described, inter alia, by G. Akovali and G. Gundogan in J. Appl. Polym. Sci. 41, 2011 (1990), G. Alkovali and F. Takrouri in J. Appl. Polym. Sci. 42, 2717 (1991) and C. I. Simionescu et al. in ACS Symp. Ser. 187, 57 (1982), the volatile low-molecular compounds are always halogenated compounds, such as halogenated hydrocarbons or phosphorus trichloride.

Surprisingly, it has now been found that effective flame-proofing is achieved in a plasmachemical process using at least one halogen-free, low-molecular phosphorus compound. In this process, the consumption of active substance is markedly lower than in the typical conventional wet-chemical processes.

Accordingly, the invention relates to a process for flame-proofing organic polymeric materials by means of a low temperature plasma treatment in the presence of at least one low-molecular, volatile compound, which process comprises subjecting the volatile compound, selected from a halogen-free phosphorus compound, to the low temperature plasma, such that a polymeric structure forms on the organic material.

The principles of gas discharge and, in particular, of plasma chemistry are known and described, inter alia, by A. T. Bell, "Fundamentals of Plasma Chemistry" in "Technology and Application of Plasma Chemistry", ed. J. R. Hollahan and A. T. Bell, Wiley, New York (1974) or by H. Suhr, Plasma Chem. Plasma Process. 3(1), 1, (1983).

Suitable low-molecular compounds for the process of this invention are primarily halogen-free, phosphorus compounds which can be volatilised or sublimed without decomposition, i.e. which are stable at $10^{-4}$ bar to normal pressure and at room temperature of up to 250° C.

Preferred phosphorus compounds which fulfill these requirements are primarily unsaturated organophosphorus acids and the derivatives thereof. Exemplary of these compounds are the following compounds:

- unsaturated phosphonous acids such as $H_2C{=}CHCH_2P(OH)_2$ or $C_6H_5CH{=}CHCOCH_2CH(C_6H_5)P(O)(OH)_2$;
- α,β-unsaturated alkyl and cycloalkyl phosphonic acids such as $H_2C{=}CHP(O)(OH)_2$;
- α,β-unsaturated phosphonic acids with an aromatic radical such as $H_2C{=}C(C_6H_5)P(O)(OH)_2$;
- β,γ-unsaturated phosphonic acids such as $H_2C{=}CHCH_2P(O)(OH)_2$;
- unsaturated phosphonic acids containing two double bonds such as $C_6H_5CH{=}CHCH{=}CHP(O)(OH)_2$;
- α,β-unsaturated phosphonic acid amides such as $H_2C{=}CHP(O)[N(CH_3)_2]_2$;
- β,γ-unsaturated phosphonic acid amides such $H_2C{=}C(CN)CH_2P(O)(NHCH_3)(OC_2H_5)$;
- α,β-unsaturated phosphonic acid esters such as $H_2C{=}CHP(O)(OCH_3)_2$, $H_2C{=}(OC_2H_5)P(O)(OC_2H_5)_2$, $H_2C{=}C[OC(O)CH_3]P(O)(OC_2H_5)_2$, $C_2H_5OCH{=}CHP(O)(OCH_3)_2$, $CH_3OC_2H_4OCH{=}CHP(O)(OCH_3)_2$, $C_2H_5SCH{=}CHP(O)(OC_3H_7)_2$, $H_2C{=}C(CH_3)P(O)(OCH_3)_2$, $H_2C{=}C(CN)P(O)(OCH_3)_2$, $H_2C{=}C[C(O)OCH_3)]P(O)(OCH_3)_2$, $H_2C{=}C[C_2H_4C(O)OC_2H_5]P(O)(OCH_3)_2$, $H_3CCH{=}CHP(O)(OCH_3)_2$, $H_5C_2CH{=}CHP(O)(OCH_3)_2$, $H_3CO(O)CCH{=}CHP(O)(OCH_3)_2$, $C_6H_5CH{=}CHP(O)(OCH_3)_2$, $C_6H_5CCH_3{=}CHP(O)(OCH_3)_2$, $C_6H_5C[indenylP(O)(OCH_3)_2]{=}CHP(O)(OCH_3)_2$, $H_2C[P(O)(OCH_3)_2](OP(O)(OCH_3)_2)$, $CH_3CH{=}C[P(O)(OCH_3)_2](OP(O)(OCH_3)_2)$ or $H_2C{=}CHP(O)(OCH{=}CH_2)_2$;
- β,γ-unsaturated phosphonic acid esters such as $H_2C{=}CHCH_2P(O)(OCH_3)_2$, $H_3CP(O)(OCH_2CH{=}CH_2)_2$ or $H_2C{=}CHCH_2P(O)(OCH_2CH{=}CH_2)_2$;
- β,γ-unsaturated hydroxy- and ketophosphonic acid esters such as $H_2C{=}CH(OH)CHP(O)(OCH_3)_2$ or $H_2C{=}CH(O)CP(O)(OC_2H_5)_2$;
- γ,δ-unsaturated alkyl and cycloalkyl phosphonic acid esters such as $H_2C{=}CH(OC_2H_5)CHCH_2P(O)(OC_2H_5)_2$ or compounds of formulae

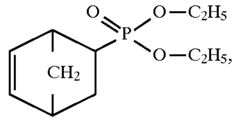
(3)

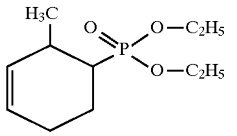
(4)

or

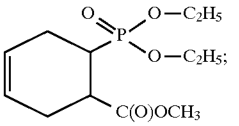
(5)

- unsaturated phosphonic acid esters containing two double bonds or one triple bond such as $H_2C{=}C{=}CHP(O)(OC_2H_5)_2$ or $H_3CC{\equiv}CP(O)(OC_2H_5)_2$;
- α,β-unsaturated phosphonodithiolic acids such as $H_5C_2OCH{=}CHP(O)(SC_2H_5)_2$;
- α,β- and γ,δ-unsaturated thiophosphonic acid esters such as $H_5C_6HC{=}CHP(S)(OCH_3)_2$ or $H_2C{=}CH(OH)CP(S)(OC_2H_5)_2$;
- α,β-unsaturated trithiophosphonic acid esters such as $H_5C_2OCH{=}CHP(S)(SOC_2H_5)_2$;
- β,γ-unsaturated phosphonous acid esters such as $H_5C_6HP(O)(OCH_2CH{=}CH_2)$, $H_5C_6P(OCH_2CH{=}CH_2)_2$, $H_5C_2HP(O)(OCH_2CH{=}CH_2)$, $H_5C_2P(OCH_2CH{=}CH_2)_2$;
- α,β-unsaturated alkyl and aryl phosphonic acid esters and alkyl and aryl phosphonoamidates such as $H_3CP(O)(OC_4H_9)(OCH{=}CH_2)$, $H_5C_6P(O)(OC_4H_9)(OCH{=}CH_2)$, $H_3CP(O)[N(CH_3)_2](OCH{=}CH_2)$ or $H_5C_6P(O)[N(CH_3)_2](OCH{=}CH_2)$;

β,γ-unsaturated hydroxy and ketoalkyl phosphonic acid esters such as $H_3C(OH)CHP(O)(OCH_2CH{=}CH_2)_2$ or $H_3C(O)CP(O)(OCH_2CH{=}CH_2)_2$;

α,β- and γ,δ-unsaturated phosphorous acid esters such as $H_2C{=}CHOP(OCH_3)_2$ or $H_2C{=}CHCH_2OP(OCH_2CH_2CN)_2$;

unsaturated phosphorous acid esters containing two or three double bonds or one to three double bonds such as $P(OH)(OCH_2CH{=}CH_2)(OCH_2CH{=}CH_2)$, $P(OC_2H_5)(OCH_2CH{=}CH_2)(OCH_2CH{=}CH_2)$, $P(OCH_2CH{=}CH_2)(OCH_2CH{=}CH_2)(OCH_2CH{=}CH_2)$, $P(OCH_2C{\equiv}H)(OCH_2C{\equiv}H)(OCH_2C{\equiv}H)$;

α,β-unsaturated phosphoric acid esters such as $H_2C{=}CHOP(O)(OC_2H_5)_2$ or $H_2C{=}CCH_3OP(O)(OC_2H_5)_2$; $C_2H_5O(O)CH{=}CCH_3OP(O)(OC_2H_5)_2$;

α,β-unsaturated phosphoric acid esters containing two or three double bonds such as $P(O)(OCH{=}CH_2)(OCH{=}CH_2)(OCH{=}CH_2)$;

β,γ-unsaturated phosphoric acid esters containing one to three double bonds such as $P(O)(OC_2H_5)(OC_2H_5)(OCH_2CH{=}CH_2)$, $P(O)(OC_2H_5)(OCH_2CH{=}CH_2)(OCH_2CH{=}CH_2)$ or $P(O)(OCH_2CH{=}CH_2)(OCH_2CH{=}CH_2)(OCH_2CH{=}CH_2)$;

phosphoric acid esters of formula

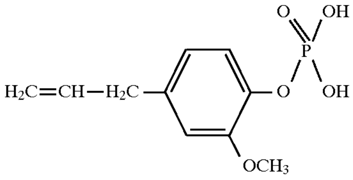

(6)

β,γ-unsaturated N-phosphoroamidates such as $H_2C{=}CHCH_2HNP(O)(OC_2H5)(OC_2H_5)$, $H_2C{=}CHCH_2CH_3NP(O)(OC_2H5)(OC_2H_5)$, $H_2C{=}CHCH_2HNP(O)(OH)(OC_2H_5)$, $H_2NP(O)(OCH_2CH{=}CH_2)(OCH_2CH{=}CH_2)$ or $H_3CNP(O)(OCH_2CH{=}CH_2)(OCH_2CH{=}CH_2)$;

α,β-unsaturated thiophosphonic acid esters such as $H_2C{=}CHOP(S)(OC_2H_5)_2$ or $H_2C{=}CHOP(S)(OCH{=}C(C_2H_5)_2)_2$;

β,γ-unsaturated thiophosphonic acid esters such as $H_2C{=}CHCH_2OP(S)(OC_2H_5)_2$ or $H_2C{=}CHCH_2OP(S)(OCH_2CH{=}CH_2)_2$;

unsaturated tertiary phosphines such as $C_6H_5P(CH{=}CH_2)_2$;

unsaturated phosphine oxides and phosphine sulfides such as $P(O)(CH_2CH{=}CH_2)_3$ or $P(S)(CH_2CH{=}CH_2)_3$.

Also suitable are substituted phosphazenes of formula $$-[PR_3N]_n-, \qquad (7)$$

wherein R is $-NHCH_2CH{=}CH_2$ and n=3. These compounds have the formula

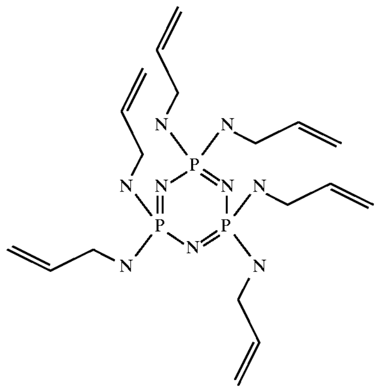

(8)

Preferred phosphorus compounds are those of formula

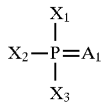

(1)

wherein $X_1$ and $X_2$ are each independently of the other hydrogen; $C_1$–$C_5$alkyl, $C_1$–$C_5$alkoxy, $C_2$–$C_5$alkenyl, each unsubstituted or substituted by hydroxy or cyano; mono- or di-$C_1$–$C_5$alkylamino; or $C_2$–$C_5$alkenyloxy; or a radical of formula $$-A_2R_1, \qquad (2)$$

$A_1$ and $A_2$ are each independently of the other oxygen or sulfur.

$R_1$ is hydrogen; $C_1$–$C_5$alkyl, $C_1$–$C_5$alkoxy, $C_2$–$C_5$alkenyl, each unsubstituted or substituted by hydroxy or cyano; mono- or di-$C_1$–$C_5$alkylamino; or $C_2$–$C_5$alkenyloxy; and $X_3$ is $C_1$–$C_5$alkyl, $C_2$–$C_5$alkenyl or $C_2$–$C_5$alkynyl, each unsubstituted or substituted by hydroxy, $C_1$–$C_5$alkoxy, $C_2$–$C_5$alkylcarbonyl, $C_2$–$C_5$alkoxycarbonyl, cyano, $C_1$–$C_5$alkylthio or phenyl; $C_3$–$C_5$alkyldienyl; $C_1$–$C_5$alkoxy which is unsubstituted or substituted by $C_1$–$C_5$alkyl, $C_2$–$C_5$alkenyl; $C_2$–$C_5$alkenyloxy; $C_2$–$C_5$alkoxycarbonyl; mono- or di-$C_1$–$C_6$alkylamino; mono- or di-$C_2$–$C_5$alkenylamino; mono- or di-$C_1$–$C_6$alkylamino; phenyl which is unsubstituted or substituted by hydroxy, $C_1$–$C_5$alkoxy, $C_2$–$C_5$alkylcarbonyl, $C_2$–$C_5$alkoxycarbonyl, $C_1$–$C_5$alkylthio or phenyl; or a radical of formula

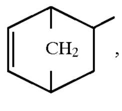 , 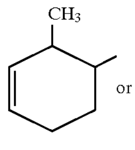 or 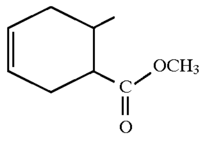

Most preferred phosphorus-containing compounds of formula (1) are those wherein $X_1$ and $X_2$ are each independently of the other hydrogen; $C_1$–$C_5$alkyl, $C_1$–$C_5$alkoxy, $C_2$–$C_5$alkenyl, each unsubstituted or substituted by hydroxy or cyano; mono- or di-$C_1$–$C_5$alkylamino; or $C_2$–$C_5$alkenyloxy;

$A_1$ is oxygen;

$R_1$ is hydrogen; $C_1$–$C_5$alkyl, $C_1$–$C_5$alkoxy, $C_2$–$C_5$alkenyl, each unsubstituted or substituted by hydroxy or cyano; mono- or di-$C_1$–$C_5$alkylamino; or $C_2$–$C_5$alkenyloxy; and $X_3$ is $C_1$–$C_5$alkyl, $C_2$–$C_5$alkenyl or $C_2$–$C_5$alkynyl, each unsubstituted or substituted by hydroxy, $C_1$–$C_5$alkoxy, $C_2$–$C_5$alkylcarbonyl, $C_2$–$C_5$alkoxycarbonyl, cyano, $C_1$–$C_5$alkylthio or phenyl; $C_3$–$C_5$alkyldienyl; $C_1$–$C_5$alkoxy which is unsubstituted or substituted by $C_1$–$C_5$alkyl, $C_2$–$C_5$alkenyl; $C_2$–$C_5$alkenyloxy; $C_2$–$C_5$alkoxycarbonyl; mono- or di-$C_1$–$C_6$alkylamino; mono- or di-$C_2$–$C_5$alkenylamino; mono- or di-$C_1$–$C_6$alkylamino; phenyl which is unsubstituted or substituted by hydroxy, $C_1$–$C_5$alkoxy, $C_2$–$C_5$alkylcarbonyl, $C_2$–$C_5$alkoxycarbonyl, $C_1$–$C_5$alkylthio or phenyl.

The phosphorus-containing compounds may be used individually and also as a mixture of different individual compounds.

Typical examples of $C_1$–$C_5$alkyl, $C_1$–$C_5$alkoxy, $C_1$–$C_5$alkylthio, mono-$C_1$–$C_5$alkylamino and di-$C_1$–$C_5$alkylamino are methyl, ethyl, n-propyl, isopropyl, n-butyl, sec-butyl, tert-butyl, amyl or isoamyl; or methoxy, ethoxy, isopropoxy, isobutoxy, tert-butoxy or tert-amyloxy; or methylthio, ethylthio, propylthio or butylthio; or methylamino, dimethylamino, diethylamino, methylethylamino, ethylamino, dipropylamino or dibutylamino.

$C_2$–$C_6$Alkenyl is typically allyl, propenyl, butenyl or, preferably, vinyl.

Typical examples of $C_2$–$C_5$alkanoyl are acetyl or propionyl.

Typical examples of $C_2$–$C_5$alkynyl radicals are ethynyl or 2-propionyl.

Typical examples of $C_3$–$C_5$alkyldienyl are propyldienyl or 1,3 butadienyl.

The following organic materials are suitable for the plasmachemical treatment of this invention:

1. Polymers of monoolefins and diolefins, for example polypropylene, polyisobutylene, polybut-1-ene, poly-4-methylpent-1-ene, polyisoprene or polybutadiene, as well as polymers of cycloolefins, for instance of cyclopentene or norbornene, polyethylene (which optionally can be crosslinked), for example high density polyethylene (HDPE), low density polyethylene (LDPE), linear low density polyethylene (LLDPE), branched low density polyethylene (BLDPE).

Polyolefins, i.e. the polymers of monoolefins exemplified in the preceding paragraph, preferably polyethylene and polypropylene, can be prepared by different, and especially by the following, methods:

a) radical polymerisation (normally under high pressure and at elevated temperature).

b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/EDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, propylene/butadiene copolymers, isobutylene/isoprene copolymers, ethylene/alkyl acrylate copolymers, ethylene/alkyl methacrylate copolymers, ethylene/vinyl acetate copolymers and their copolymers with carbon monoxide or ethylene/acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$–$C_9$) including hydrogenated modifications thereof (e.g. tackifiers) and mixtures of polyalkylenes and starch.

5. Polystyrene, poly(p-methylstyrene), poly(α-methylstyrene).

6. Copolymers of styrene or α-methylstyrene with dienes or acrylic derivatives, for example styrene/butadiene, styrene/acrylonitrile, styrene/alkyl methacrylate, styrene/butadiene/alkyl acrylate, styrene/butadiene/alkyl methacrylate, styrene/maleic anhydride, styrene/acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

7. Graft copolymers of styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on polyalkyl acrylates or polyalkyl methacrylates, styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated or sulfochlorinated polyethylene, copolymers of ethylene and chlorinated ethylene, epichlorohydrin homo- and copolymers, especially polymers of halogen-containing vinyl compounds, for example polyvinyl chloride, polyvinylidene chloride, polyvinyl fluoride, polyvinylidene fluoride, as well as copolymers thereof such as vinyl chloride/vinylidene chloride, vinyl chloride/vinyl acetate or vinylidene chloride/vinyl acetate copolymers.

9. Polymers derived from α,β-unsaturated acids and derivatives thereof such as polyacrylates and polymethacrylates; polymethyl methacrylates, polyacrylamides and polyacrylonitriles, impact-modified with butyl acrylate.

10. Copolymers of the monomers mentioned under 9) with each other or with other unsaturated monomers, for example acrylonitrile/ butadiene copolymers, acrylonitrile/ alkyl acrylate copolymers, acrylonitrile/alkoxyalkyl acrylate or acrylonitrile/vinyl halide copolymers or acrylonitrile/ alkyl methacrylate/butadiene terpolymers.

11. Polymers derived from unsaturated alcohols and amines or the acyl derivatives or acetals thereof, for example polyvinyl alcohol, polyvinyl acetate, polyvinyl stearate, polyvinyl benzoate, polyvinyl maleate, polyvinyl butyral, polyallyl phthalate or polyallyl melamine; as well as their copolymers with olefins mentioned in 1) above.

12. Homopolymers and copolymers of cyclic ethers such as polyalkylene glycols, polyethylene oxide, polypropylene oxide or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides, polyamide-imides and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate and polyhydroxybenzoates, as well as block copolyether esters derived from hydroxyl-terminated polyethers; and also polyesters modified with polycarbonates or MBS.

19. Polycarbonates and polyester carbonates.

20. Polysulfones, polyether sulfones and polyether ketones.

21. Crosslinked polymers derived from aldehydes on the one hand and phenols, ureas and melamines on the other hand, such as phenol/formaldehyde resins, urea/ formaldehyde resins and melamine/formaldehyde resins.

22. Drying and non-drying alkyd resins.

23. Unsaturated polyester resins derived from copolyesters of saturated and unsaturated dicarboxylic acids with polyhydric alcohols and vinyl compounds as crosslinking agents, and also halogen-containing modifications thereof of low flammability.

24. Crosslinkable acrylic resins derived from substituted acrylates, for example epoxy acrylates, urethane acrylates or polyester acrylates.

25. Alkyd resins, polyester resins and acrylate resins crosslinked with melamine resins, urea resins, polyisocyanates or epoxy resins.

26. Crosslinked epoxy resins derived from polyepoxides, for example from bisglycidyl ethers or from cycloaliphatic diepoxides.

27. Natural polymers such as cellulose, rubber, gelatin and chemically modified homologous derivatives thereof, for example cellulose acetates, cellulose propionates and cellulose butyrates, or the cellulose ethers such as methyl cellulose; as well as rosins and their derivatives.

28. Blends of the aforementioned polymers (polyblends), for example PP/EPDM, Polyamide/EPDM or ABS, PVC/ EVA, PVC/ABS, PVC/MBS, PC/ABS, PBTP/ABS, PC/ASA, PC/PBT, PVC/CPE, PVC/acrylates, POM/ thermoplastic PUR, PC/thermoplastic PUR, POM/acrylate, POM/MBS, PPO/HIPS, PPO/PA 6.6 and copolymers, PA/HDPE, PA/PP, PA/PPO.

The process of this invention is particularly suitable for flame-proofing textile fibre materials in any kind of presentation, such as fibres, yarns, spools, nonwoven fabrics, knitted or woven fabrics or finished garments, or furnishing fabrics such as carpets, furniture upholstery, curtains or fabric-covered wallpaper.

The textile material to be finished may be of natural or synthetic origin or blends of natural and synthetic fibres. Suitable natural fibres are in particular keratin-containing or cellulosic fibres, including fibres obtained from regenerated cellulose, for example linen, hemp, sisal, ramie and, preferably, wool, cotton and/or artificial silk, viscose rayon or viscose fibres.

In addition to pure cellulose fibres, blends thereof with synthetic fibres, wherein the cellulose component is preferably 20 to 80% by weight of the blend, may suitably be used. Examples of suitable synthetic fibres are polyester, polyamide, polyolefin, acrylonitrile copolymers or, most preferably, polyacrylonitrile. Fibres that are also suitable, but less preferred, are cellulose acetate fibres, typically cellulose secondary acetate and cellulose triacetate, and fibres from crosslinked polyvinyl alcohols, typically acetates or ketals of polyvinyl alcohols.

Most preferred, however, in addition to cellulose fibres and blends thereof with synthetic fibres, are purely synthetic fibre materials, in particular those made from polyester or, most preferably, polyacrylonitrile, acrylonitrile copolymers or polyolefin fibres.

The polyester fibres are mainly derived from terephthalic acid, typically from poly(ethylene glycol terephthalate) or poly(1,4-cyclohexylenedimethylterephthalate).

The acrylonitrile copolymers conveniently contain 50% by weight, preferably at least 85% by weight, of acrylonitrile component, based on the copolymer. Said copolymers are in particular those for the preparation of which other vinyl compounds, typically vinyl chloride, vinylidene chloride, methacrylates, acrylamide or styrenesulfonic acids, have been used as comonomers.

Polyolefin fibres are preferred, in particular filled or unfilled polypropylene fibres in the form of staple or filament.

For the novel plasmachemical flame-proofing process, the dry and untreated organic material is conveniently put into a plasma reactor. The construction and assembly of such a reactor is known per se, for example from J. A. Thornton, Thin Solid Films, 107 (1), 3 (1983) or A. Rutscher (Ed.): Wissensspeicher Plasmatechnik, VEB Fachbuchverlag, Leipzig (1983). For the process of this invention it is preferred to use a reactor which is equipped with two parallel electrodes (parallel plate reactor). The distance between the electrodes usually varies and is 1 to 30 cm, preferably 2 to 10 cm. The current can be coupled capacitively or inductively and is usually applied at the lower (substrate) electrode (=cathode), the upper electrode (=anode) preferably being a ao-called “plasma douche”.

The organic material to be treated is placed on the substrate electrode. The reactor is then closed and evacuated over 10 to 20 minutes by means of a mechanical vacuum pump until a pressure of at least $10^{-3}$ mbar is reached.

The organic material may be treated on one side or also on both sides.

The process may be carried out continuously or batchwise.

In batchwise operation, the material is for example unwound before passing through the plasma zone, then guided through the plasma zone and subsequently wound on to a second bobbin.

In continuous operation (for example with rolled up polymer films or textile webs), special vacuum ports are provided so that the goods can be introduced and, upon completion of the treatment, guided out again without difficulty.

The arrangement of the electrodes may be such that in the continuous as well as in the batch operation, the material is treated on one or both sides. The material is preferably treated on both sides.

The desired low-molecular compound is weighed in an evaporator crucible and placed in a preheated evaporation source. The temperature of the evaporation source also determines the throughput rate of the low-molecular compound, which is usually 1 to 25 sccm/min (sccm= “standard cubic centimeter”), preferably 5 to 10 sccm/min. The low-molecular compound is usually diluted with an inert carrier gas such as argon, helium, or a mixture of these inert gases. The throughput rate of the inert carrier gas is determined with a throughput meter. The ratio of low-molecular compound to inert gas (mixture) is usually 1:10 and, preferably, 1:2.

For purification, the substrate surface may be pretreated over 1 to 5 minutes, preferably over 1 to 2 minutes, with an inert gas plasma, typically consisting of an oxygen, helium or argon plasma, or of a mixture of these gases. The plasma is then extinguished. The desired gaseous mixture of low-molecular phosphorus compound and inert gas is subsequently passed into the reactor and allowed to flow through the reactor while adjusting the flow rate to a predefined value which is in the range from 1 to 25, preferably from 5 to 20 sccm/min, during the plasma treatment. The pressure in the reactor during the plasma treatment is usually from $10^{-3}$ to 5 mbar, preferably from $10^{-1}$ to 1 mbar.

The actual plasma is produced by applying a variable current at the electrodes. A direct current (DC) or alternating current (AC) can be applied at the electrodes, and frequencies of 1 kHz to 3 GHz can be produced with a transmitter. It is preferred to use frequencies of 1 kHz to 120 kHz, 13.56 MHz, 27.12 MHz or 2.45 GHz. Together with the gas mixture a glow discharge is generated in the reactor, whereupon energy-rich ions, photones, as well as highly reactive neutral molecules or radicals are produced which act on the surface of the organic material. The desired polymeric film then deposits on the surface of the organic material.

The electric power may also be varied and is in the range from c. 0.1 to 1 W/cm$^2$, preferably from 0.1 to 0.3 W/cm$^2$.

The deposition time, i.e. the actual time during which the organic material is exposed to the plasma, may be from 1 to 15 minutes, preferably from 2 to 10 minutes.

The low temperature plasma treatment is preferably carried out under the following conditions:

pressure (p): 0.1 to 1 mbar
wlectric power (P): 0.1 to 1 W/cm$^2$
throughput rate of the low-molecular compound (F): 1 to 25 sccm/min,
treatment time (t): 1 to 15 min Upon completion of the treatment, the plasma is extinguished and the gas supply discontinued. The evacuation of the reactor is continued over 1 to 10 minutes at a pressure of typically 0.1 to 0.01 mbar. Subsequently, the reactor is aerated and the weight increase of the substrate and the weight decrease of the low-molecular compound in the evaporator crucible are measured. The throughput rate of the low-molecular compound as well as the add-on of phosphorus on the organic substrate can be determined from these data.

With the process of this invention a very wide range of organic substrates may be effectively flame-proofed without adversely affecting their other properties, and the total content of phosphorus on the substrate is markedly lower than in conventional processes.

The invention further relates to a process for the preparation of phosphorus-containing, halogen-free films of polymeric structure. The process comprises subjecting at least one volatile, low-molecular compound, selected from a halogen-free phosphorus compound, to a low temperature plasma treatment and allowing the film resulting from the plasma treatment to deposit on an organic substrate.

The following Examples serve to illustrate the invention.

EXAMPLE 1

For coating, a polypropylene substrate (190.4 cm$^2$, thickness: 90 μm, weight: 1852 mg) is placed on the charged lower electrode in the parallel plate reactor, and the reactor is evacuated over 15 minutes to at least $10^{-3}$ mbar. During this time, 3456 mg of dimethyl vinylphosphonate monomer are weighed in an evaporator crucible and added to the evaporation source mounted above the upper electrode and fitted with a helium carrier gas line with stop valve. This evaporation source is thermostatically adjusted to 25° C., corresponding to a monomer flow of c. 10 nccm monomer during coating. The helium gas itself, controlled by a mass flow controller, flows at a throughput rate of 20 sccm/min.

To purify the substrate surface, a pretreatment is carried out with an oxygen plasma under the following conditions:

throughput rate (F): 20 sccm/sccm
pressure (p): 0.1 mbar current (P): 85 W (corresponding to 0.3 $W/cm^2$)
treatment time (t): 2 min The plasma is then extinguished, the valve of the monomer chamber to the chamber is opened, the stop valve of the helium carrier gas line to the evaporation source is also opened, and the plasma is then ignited once more. The pressure is corrected to 0.5 mbar. After a coating time of 5 minutes, the plasma is extinguished, the valve of the source chamber and the stop valve of the helium carrier gas line are closed and evacuation is continued for 5 minutes at c. 0.2 mbar. Subsequently, the reactor is aerated and the substrate is taken out and weighed. The increase in weight of the substrate is 33 mg. The evaporation crucible is then removed and the weight loss of the low-molecular compound is determined. The residue is 3188 mg and the consumption of monomer is therefore 268 mg. The yield on the substrate surface is thus 12.3% and the total yield is 20.3%, based on the electrode area.

Total amount of phosphorus: 0.55% by weight (starting material <0.01%)
LOI (=limiting oxygen index): 19.9 (starting material 18.2)

The test for determining the LOI consists in measuring the minimum amount of oxygen in a nitrogen-oxygen atmosphere required for continuous combustion of the substrate. The amount of oxygen required for continuous combustion is in direct ratio to the burning behaviour of the substrate, i.e. the less oxygen suffices for combustion, the greater is the flammability of the substrate. In other words: As the LOI increases, flammability decreases.

The LOI determined indicates that the material treated according to the process of the present invention has been effectively flame-proofed.

EXAMPLES 2 TO 5

For coating, a washed off meraclone-polypropylene woven fabric with a weight per unit area of 165 $g/m^2$ and fixed at 145° C., is placed on the charged lower electrode in the parallel plate reactor and then pretreated for 2 minutes with helium plasma in accordance with the procedure of Example 1.

Plasma treatment is then carried out as described in Example 1 under the following deposition conditions:

plasma gas/carrier gas: helium
monomer: dimethyl vinylphosphonate
throughput rate (F): 20 sccm
operation pressure: 0.1 torr
deposition time: 15 minutes per side of substrate By varying the monomer flow and the electric power, the following results are obtained (Table 1):

TABLE 1

| Example | Monomer flow [$mgmin^{-1}$] | Plasma-charge | add-on [$mgcm^{-2}$] | Deposition rate [$mgcm^{-2}min^{-1}$] | Yield substrate/ electrode [%] | PCc [% by weight] | PCEA [% by weight] | LOI |
|---|---|---|---|---|---|---|---|---|
| 2 | 39.5 | 50 | 0.96 | 0.032 | 12.6/15.5 | 1.3 | 1.2 | 24.0 |
| 3 | 31.2 | 50 | 0.81 | 0.027 | 13.6/16.6 | 1.1 | 1.0 | 23.5 |
| 4 | 8.1 | 90 | 0.24 | 0.008 | 15.9/19.9 | 0.3 | 0.3 | 21.5 |
| 5 | 38.9 | 90 | 0.87 | 0.029 | 11.5/14.2 | 1.2 | 1.2 | 24.5 |

PCc calculated phosphorus content
PCEA phosphorus content from elemental analysis After deposition, aftertreatment is carried for 5 minutes with helium plasma.

The LOI values recorded in the Table show that the material treated according to the process of this invention has been effectively flame-proofed.

What is claimed is:

1. A process for flame-proofing an organic polymeric substrate which comprises:

A) subjecting at least one volatile, low molecular halogen-free phosphorous compound which is an unsaturated organophosphorous acid or derivative thereof, a substituted phosphazene compound or a phosphorus compound of the formula

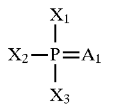

(1)

wherein $X_1$ and $X_2$ are each independently of the other a radical of the formula $$-A_2R_1, \quad (2)$$

$A_1$ and $A_2$ are each independently of the other oxygen or sulfur;

$R_1$ is hydrogen; $C_1$–$C_5$alkyl, $C_1$–$C_5$alkoxy, $C_2$–$C_5$alkenyl, each unsubstituted or substituted by hydroxy or cyano; mono- or di-$C_1$–$C_5$alkylamino; or $C_2$–$C_5$alkenyloxy;

$X_3$ is $C_1$–$C_5$alkyl, $C_2$–$C_5$alkenyl or $C_2$–$C_5$alkynyl, each unsubstituted or substituted by hydroxy, $C_1$–$C_5$alkoxy, $C_2$–$C_5$alkylcarbonyl, $C_2$–$C_5$alkoxycarbonyl, cyano, $C_1$–$C_5$alkylthio or phenyl; $C_3$–$C_5$alkyldienyl; $C_1$–$C_5$alkoxy which is unsubstituted or substituted by $C_1$–$C_5$alkyl, $C_2$–$C_5$alkenyl; $C_2$–$C_5$alkenyloxy; $C_2$–$C_5$alkoxycarbonyl; mono- or di-$C_1$–$C_6$alkylamino; mono- or di-$C_2$–$C_5$alkenylamino; mono- or di-$C_1$–$C_6$alkylamino; phenyl which is unsubstituted or substituted by hydroxy, $C_1$–$C_5$alkoxy, $C_2$–$C_5$alkylcarbonyl, $C_2$–$C_5$alkoxycarbonyl, $C_1$–$C_5$alkylthio or phenyl; or a radical of formula

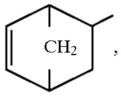, 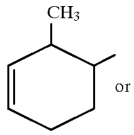 or 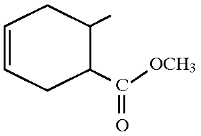

to a low temperature plasma treatment; and

B) forming a polymeric structure on the surface of the organic polymeric substrate by contacting the plasma-subjected halogen-free phosphorus compound of A with the organic polymeric substrate.

2. A process according to claim 1, wherein the halogen-free phosphorus compound can be volatilised or sublimed without decomposition.

3. A process according to claim 1, wherein:

$X_1$ and $X_2$ are each independently of the other hydrogen; $C_1$–$C_5$alkyl, $C_1$–$C_5$alkoxy, $C_2$–$C_5$alkenyl, each unsubstituted or substituted by hydroxy or cyano; mono- or di-$C_1$–$C_5$alkylamino; or $C_2$–$C_5$alkenyloxy;

$A_1$ is oxygen;

$R_1$ is hydrogen; $C_1$–$C_5$alkyl, $C_1$–$C_5$alkoxy, $C_2$–$C_5$alkenyl, each unsubstituted or substituted by hydroxy or cyano; mono- or di-$C_1$–$C_5$alkylamino; or $C_2$–$C_5$alkenyloxy;

$X_3$ is $C_1$–$C_5$alkyl, $C_2$–$C_5$alkenyl or $C_2$–$C_5$alkynyl, each unsubstituted or substituted by hydroxy, $C_1$–$C_5$alkoxy, $C_2$–$C_5$alkylcarbonyl, $C_2$–$C_5$alkoxycarbonyl, cyano, $C_1$–$C_5$alkylthio or phenyl; $C_3$–$C_5$alkyldienyl; $C_1$–$C_5$alkoxy which is unsubstituted or substituted by $C_1$–$C_5$alkyl, $C_2$–$C_5$alkenyl; $C_2$–$C_5$alkenyloxy; $C_2$–$C_5$alkoxycarbonyl; mono- or di-$C_1$–$C_6$alkylamino; mono- or di-$C_2$–$C_5$alkenylamino; mono- or di-$C_1$–$C_6$alkylamino; phenyl which is unsubstituted or substituted by hydroxy, $C_1$–$C_5$alkoxy, $C_2$–$C_5$alkylcarbonyl, $C_2$–$C_5$alkoxycarbonyl, $C_1$–$C_5$alkylthio or phenyl.

4. A process according to claim 1, wherein the halogen-free phosphorus compound is used individually or as a mixture of different individual compounds.

5. A process according to claim 1, wherein the halogen-free phosphorus compound is diluted with an inert carrier gas.

6. A process according to claim 5, wherein the carrier gas is argon or helium, or a mixture of said gases.

7. A process according to claim 6, wherein the mixture of low-molecular compound/inert gas is in the ratio of 1:10.

8. A process according to claim 1, wherein the throughput rate of the halogen-free phosphorus compound is from 1 to 25 sccm/min.

9. A process according to claim 1, wherein the plasma treatment is carried out in a parallel plate reactor.

10. A process according to claim 1, wherein the plasma treatment is carried out at a pressure of $10^{-3}$ mbar to 5 mbar.

11. A process according to claim 1, wherein the plasma treatment is carried out at a transmission rate of 0.1 to 1 $W/cm^2$.

12. A process according to claim 1, wherein the plasma treatment time is from 1 to 15 minutes.

13. A process according to claim 1, wherein the plasma treatment is carried out under the following conditions:

pressure (p): 0.1 to 1 mbar current (P): 0.1 to 1 $W/cm^2$ throughput rate of the monomeric compound (F): 1 to 25 sccm/min, treatment time (t): 1 to 15 min.

14. A process according to claim 1, wherein the organic material is treated with an inert gas prior to the plasma treatment.

15. A process according to claim 14, wherein the inert gas is oxygen, argon, helium, or a mixture of said gases.

16. An organic material treated according to claim 1.

* * * * *

UNITED STATES PATENT AND TRADEMARK OFFICE

CERTIFICATE OF CORRECTION

PATENT NO. : 5,856,380

DATED : JANUARY 5, 1999

INVENTOR(S) : MICHAEL BAUER ET AL.

It is certified that error appears in the above-identified patent and that said Letters Patent is hereby corrected as shown below:

On the cover page, Section [30] should read:

-- [30] Foreign Application Priority Data

Dec. 16,1993 [CH] Switzerland 3767/93 --.

Signed and Sealed this

Eleventh Day of May, 1999

*Attest:*

Q. TODD DICKINSON

*Attesting Officer*

*Acting Commissioner of Patents and Trademarks*